United States Patent [19]

Kölblin et al.

[11] Patent Number: 4,770,575
[45] Date of Patent: Sep. 13, 1988

[54] CENTERING AND CHUCKING SYSTEM

[75] Inventors: Rolf Kölblin, Fischen; Reinhard Schneider, Bergneustadt; Heinrich Burgtorf, Remscheid, all of Fed. Rep. of Germany

[73] Assignee: Gebruder Honsberg GmbH, Remscheid-Hasten, Fed. Rep. of Germany

[21] Appl. No.: 91,395

[22] Filed: Aug. 31, 1987

[51] Int. Cl.⁴ .............................................. B23C 1/02
[52] U.S. Cl. ................................... 409/218; 279/1 L; 408/238; 409/230
[58] Field of Search ................... 279/1 L; 408/238; 409/201, 218, 204, 214, 215, 230; 82/36 B

[56] References Cited

U.S. PATENT DOCUMENTS

| | | | |
|---|---|---|---|
| 3,614,909 | 10/1971 | Neuser | 409/218 |
| 3,636,814 | 1/1972 | Esch | 409/218 |
| 3,757,637 | 9/1973 | Eich et al. | 409/230 |
| 4,384,811 | 5/1983 | Eckstein et al. | 409/215 |
| 4,557,645 | 12/1985 | Marsland | 409/215 |
| 4,709,455 | 12/1987 | D'Andrea et al. | 409/215 |

Primary Examiner—J. Patrick McQuade
Attorney, Agent, or Firm—Spensley Horn Jubas & Lubitz

[57] ABSTRACT

A centering and chucking system for fixing an interchangeable element to a carrier body. The carrier body is provided with guide elements whose guide surfaces are arranged along a coordinate system through the center of which extends the reference axis, e.g. the axis of a spindle. Due to the arrangement of two centering means along one axis of the coordinate system and of at least another centering means along the other axis, the reference axes of both parts are not displaced relative to each other by changes of temperature. Although the centering means are provided outside the reference axis, the system in said reference axis is determined by them.

8 Claims, 3 Drawing Sheets

CENTERING AND CHUCKING SYSTEM

BACKGROUND OF THE INVENTION

1. Field of the Invention

The invention relates to a centering and chucking system.

2. Description of Related Art

For machine tools in operation, it is frequently necessary to accurately fix an interchangeable element to a carrier body. For instance, an interchangeable spindle head (or another tool head) must be positioned very accurately on the frame or carriage of the machine tool to ensure that the spindle may take the desired position and that the tool may be moved exactly to the positions predetermined by the machine control. However, not only the tool or tool head supporting the tool (e.g. a spindle head) must be mounted in an exactly defined position and alignment, but the same is also applicable to the workpiece under treatment. If a workpiece is chucked on a pallet to be moved to a machine tool for machining the workpiece, the pallet must be positioned exactly at the machine tool so as to perform a machining by the tool precisely at the right point of the workpiece.

The known centering and chucking systems allow an exact positioning of the interchangeable element with respect to the carrier body in that the reference axes of carrier body and interchangeable element are coincident. However, difficulties may arise if the individual units of the machine tool are exposed to different temperatures. If a machine tool is tooled in the morning, in a cold factory, while, in the course of the day, temperature rises, the original centering conditions change. In other words, it may happen that the spindle of an interchangeable spindle head does not continue to occupy, relative to the machine tool, exactly the same position as taken originally and by which the machine program is dictated.

It has been known to connect, in the manner of a fixed bearing, one end of the interchangeable part (with round bolts) to the carrier body and to design the opposite end such as to form a displaceable loose bearing (with sword bolts), so that the interchangeable element may freely thermally change its length. In such a case, the only point of the interchangeable element which remains unchanged with respect to the carrier body is the site of the fixed bearing. Since the latter cannot be mounted in the reference axis where, in the case of a spindle head, for instance, the spindle is located, the reference axis (e.g. the spindle axis) is always spaced from the fixed bearing with resultant thermally conditioned changes of position of the reference axes of the two elements relative to each other.

According to U.S. Pat. No. 4,384,811, there has been known a milling machine comprising an interchangeable spindle head, the machine body having four fixation members whose ends are provided with grooves for the engagement of aligning noses positioned on the rear surface of the spindle head, the fixation members being generally arranged along the coordinates of a coordinate system which intersect on the spindle axes. The fixation members are displaceable along oblique paths so that the setting angle of the milling tools may be changed by a controlled movement of the fixation members. No firm guide surfaces are provided at the carrier body thus not allowing a precise alignment of the interchangeable element with respect to the carrier body.

It is an object of the invention to provide a centering and chucking system in which the reference axes of both elements, also in case of thermal length changes of one element, are not mutually displaced so that a high precision of mutual alignment of both reference axes is not only established, but may be also maintained under varying operating conditions.

SUMMARY OF THE INVENTION

Each abutment and guide element of the invention comprises a plane guide surface enabling the associated centering element to slidingly move thereon. The guide surfaces are arranged along a system of coordinates having its center on the reference axis of the carrier body, thus allowing for the interchangeable element to expand or contract itself in all directions without a resultant change of position of its reference axis. According to the invention, all bearings by which the interchangeable element is centered on the carrier member are loose bearings allowing a movement along one of the coordinates of the system of coordinates, while, in transverse direction to said coordinate, a fixation or centering is caused. All of the bearings may be situated in spaced relationship to both (coincident) reference axes (centers of axes) so that a spindle or another constructional element arranged along a reference axis, is not affected by a bearing or contact-guide element. The only stationary point of the interchangeable element is situated on the reference axis of said part although, in said point, there is no connection to the carrier member, and all bearings and contact surfaces are spaced from said point. Thus, one may define a locally invariable point which keeps its position under any temperature without the need of providing at said point (along the reference axis, e.g. in the center of the spindle) a component required for centering. The oblique surface of the pressure element adapted to be moved out of the carrier body acts on the centering element of the interchangeable member to press said centering element towards the guide surface. Thus, a defined abutment to the guide surface of the carrier body is achieved for the centering element of the interchangeable member, the latter being thus aligned with high accuracy and free of play to the coordinates of the coordinate system.

The centering and chucking system of the invention preferably lends itself to fix a spindle head or another tool or machining head to a machine tool and to secure pallets for supporting workpieces or the like to a corresponding base. In fact, a highly accurate operation independent of temperature fluctuations and of local expansions of individual components is possible this way in case of numerically controlled machine tools which are movable along a number of axes.

BRIEF DESCRIPTION OF THE DRAWINGS

Embodiments of the invention will be explained hereunder in more detail with reference to the drawings in which.

DESCRIPTION OF THE PREFERRED EMBODIMENT

Figure 1:
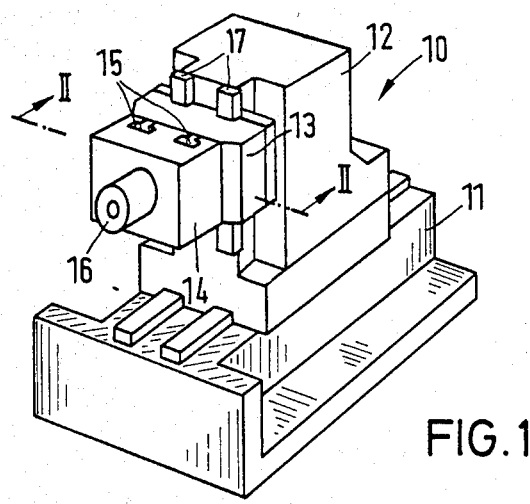
FIG. 1 is a schematic perspective view of a machine tool.
Figure 4:
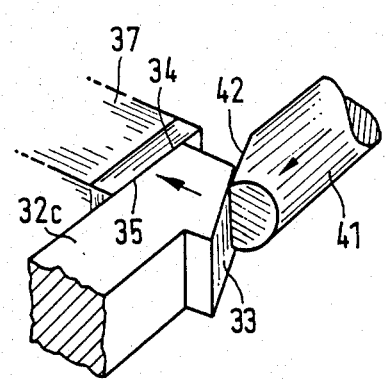
FIG. 4 is a schematic perspective view to show a centering element coacting with a contact- and guide element, and a pressure element.

FIG. 1 shows a machine tool 10 comprising a frame 12 displaceable horizontally on a machine bed 11, the front side of the frame 12 being provided with the carrier body 13 movable on vertical guide gibs 17. To the front side of the carrier body 13, there is fixed the interchangeable element 14 which, in the instant case, is a spindle head whose rear side is provided with T-shaped vertical guide grooves 15 into which extend the chucking elements of the carrier body 13. To remove interchangeable element 14 from the carrier body 13, the chucking elements are released, thus allowing for element 14 to move vertically upward away from the carrier body 13, while, on the other hand, another element 14 may be shifted with its grooves 15 from the top before the carrier body 13, whereby the chucking elements of the carrier body 13 engage the vertical grooves 15. The rotatable spindle 16 projects forwardly from the front side of the interchangeable element 14.

Frame 12 contains a (non-illustrated) driving means for spindle 16. Shaft 18 of said driving means extends vertically in the interior of frame 12 and is coupled to a horizontal shaft extending through the interior of carrier body 13 to be connected to spindle 16 if the interchangeable element 14 is joined to carrier body 13. The spindle driving shaft extends in the latter along reference axis 19 (see FIG. 3). The reference axis 20 of the interchangeable element 14 is the spindle axis. In case of a proper alignment of both elements 13, 14, the two reference axes 19 and 20 are coincident.

Figure 3:
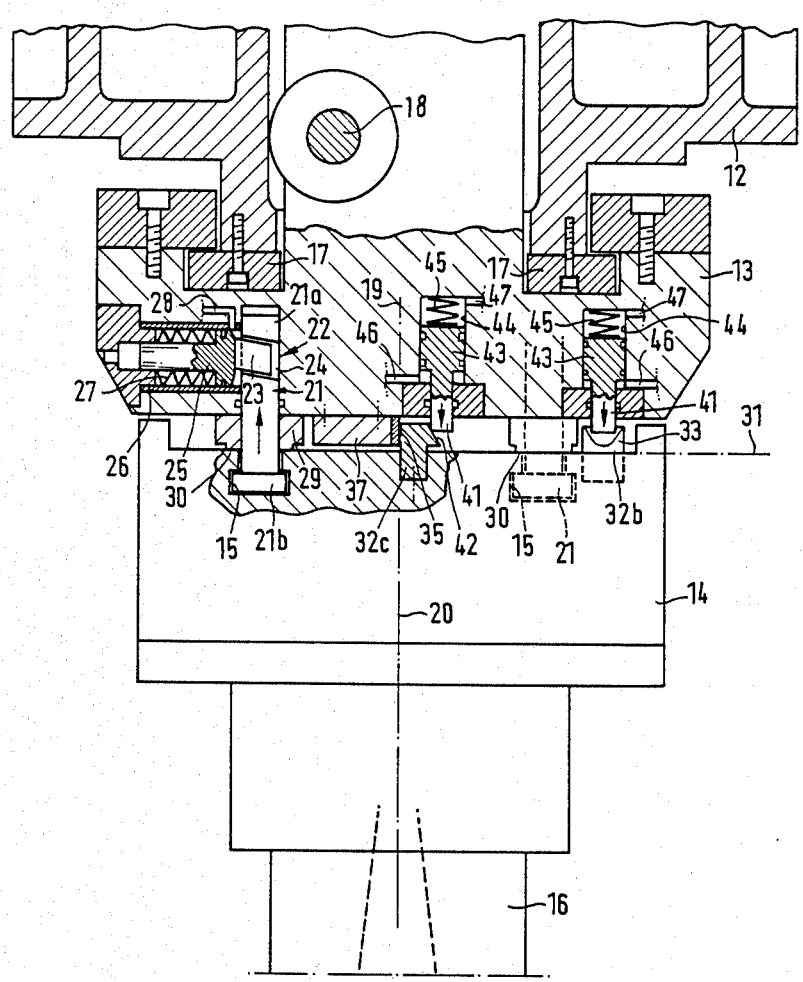
FIG. 3 is a section along line III—III of FIG. 2.

The carrier body 13 comprises four chucking elements 21 consisting each of a shaft 21a displaceable horizontally in the carrier body 13, and of a broader head 21b provided at the external shaft end. It is ensured by design and dimension of the external end of shaft 21a and of head 21b that they fit into the T-shaped grooves 15. FIG. 3 shows the chucking means for withdrawing a chucking element 21, said chucking means consisting of wedge-gear 22 in which an oblique slide 23 disappears in an inclined transverse groove 24 of shaft 21a, the slide 23 being fixed to a piston 25 which is displaceable in a cylinder 26 extending transversely to shaft 21a.

Figure 2:
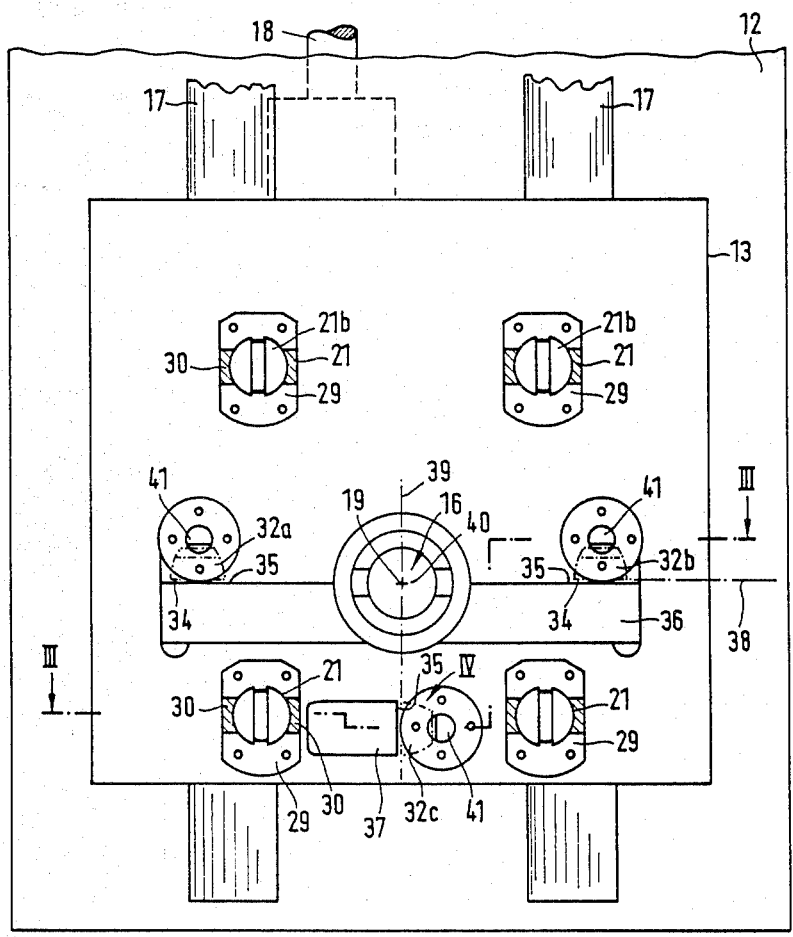
FIG. 2 is a section along line II—II of FIG. 1, i.e. along the contact plane of both elements adapted to be fixed relative to each other, the interchangeable element being removed.

Cylinder 26 accomodates a spring 27 to press the piston 25 towards shaft 21a which, (with respect to element 14) is pressed into its return position. To release the chucking element 21, the end of piston 25 averted from spring 27 is exposed to pressure through line 28 so that the piston 25 is pressed back counter to the action of spring 27, whereby, for the release of element 14, the chucking element 21 is pressed out of carrier body 13. Due to spring 27, the tension is maintained also in case of a pressure failure. All of the four chucking elements 21 provided in the order of a rectangle, as evident from FIG. 2, are controlled synchroneously.

Shaft 21a of each chucking element 21 projects through the aperture of a block 29 being secured to the front side of the carrier body 13. The front side of each block 29 comprises two projecting fine machined abutment surfaces 30 contacted by element 14 which is drawn thereagainst by chucking elements 21. All abutment surfaces 30 are situated in one common vertical plane which is designated as abutment plane 31 in which the rear wall of the interchangeable element 14 abuts against eight abutment surfaces 30 in total.

Three centering elements 32a, 32b, and 32c projecting from the rear wall of the interchangeable element 14 and fixed to the latter comprise each an oblique surface 33 and a plane abutment surface 34 extending at right angles to the abutment plane 31.

Abutment surface 34 extends in parallel to a guide surface 35 of a guide element 36 or 37 secured to the front wall of the carrier body. As obvious from FIG. 2, there is provided for both centering elements 32a and 32b one common guide element 36 in the form of a horizontal beam having on its top the horizontal guide surfaces 35 which extend exactly at the height of the horizontal axis 38 of the coordinate system 40 whose center is situated on the reference axis 19 or the axis of spindle 16, while on the vertical axis 39 of the coordinate system 40, there is situated the vertical guide surface 35 of guide element 37.

To each guide surface 35, there is assigned a pin-shaped pressure element 41 which is displaceable in the carrier body 13 in parallel to the reference axis 19, and whose front end projects out of the carrier body 13. The pressure element 41 is provided with an oblique surface 42 aligned in parallel to the oblique surface 33 of the appertaining centering element. If element 14 is mounted on carrier body 13, the head of each centering element extends into the gap between the associated guide surface 35 and the oblique surface 42. Should the pressure element 41 be removed from carrier body 13, the centering element 32 is pressed by the inclined surfaces 42 and 33 against the guide surface 35.

As evident from FIG. 2, the gaps between the pressure element 41 and the guide element 36 are vertical in case of the centering elements 32a and 32b, so that the horizontal abutment surfaces 34 of said centering elements are vertically pressed downwardly against the horizontal guide surfaces 35. On the other hand, the abutment surface of centering element 32c is pressed horizontally against the vertical guide surface 35 of guide element 37. By this means, the reference axes 19 and 20 are aligned relative to each other, and the three centering means are arranged in spaced relationship to spindle 16.

Each pin-type pressure element 41 is connected to a piston 43 which is movable in a cylinder 44 of the carrier body 13 and which, by pressure in line 47 and supported by a spring 45, is pressed outwardly (i.e. into the centering position). By pressure in a line 46, the piston may be urged back by compression of spring 45 in order to release the centering effect. Due to spring 45, it is ensured that element 14 absolutely maintains its position also in case of a pressure failure.

To center and chuck the element 14 at the carrier body 13, element 14 with the T-shaped grooves 15 is vertically shifted over the heads of the chucking elements 11. Subsequently, lateral centering is performed by moving out the lower pressure element that cooperates with centering element 32c. Thereafter, vertical centering is achieved by actuating the two pressure elements 41 which cooperate with centering elements 32a and 32b. By causing a corresponding coincidence between reference axes 19 and 20, the four chucking elements 21 are drawn back simultaneously into the carrier body 13 so that the interchangeable element 14 is chucked and locked at the carrier body 13.

In case of an unintentional opening of the locking system, e.g. by faulty switching, element 14 may not drop for it is held in T-grooves 15 and rests on the guide surfaces with the centering elements 32a and 32b.

In case of possible length changes of the interchangeable element 14 relative to the carrier body 13 due to local differences in temperature, the coincidence between the reference axes 19 and 20 is maintained.

The position of pistons 25 or pistons 43 may be controlled by hydraulic or pneumatic channels through which a flow is possible only in case of specific positions of the pistons. Thus, feedbacks are possible to detect whether the chucking elements 21 or the pistons 43 really occupy the operating position.

Moreover, nozzle bores for the discharge of compressed air may be provided at the abutment faces 30 and 35 in order to clean the latter from deposits, on the one hand, and to detect, via pressure sensors, on the other hand, whether element 14 is situated in the chucking position in which the nozzle bores are closed by it.

Finally, the heads 21b of the chucking elements 21 may be provided with rolls in order to reduce frictional losses and to avoid wear at the abutment faces 30 during the entry and release of element 14.

Figure 5:
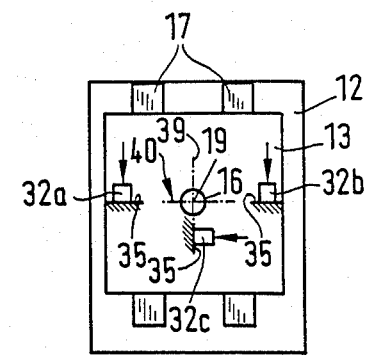
FIG. 5 is a schematic view of one embodiment.

FIG. 5 shows a condensed arrangement of three guide surfaces 35 at the front side of carrier body 13. The additionally drafted centering elements 32a, 32b and 32c are not secured to the carrier body 13, but to the (non-illustrated) interchangeable element. The arrows show the directions of action of the associated pressure elements. While the two lateral centering points used to perform lateral centering are spaced farther from the center of the coordinate system 40, the lower centering point causing the horizontal centering is provided at a closer distance. Said lower centering point may be situated near to or even in the coordinate system if this is allowed by the structural conditions. In place of one horizontal centering point, it is also possible to provide two such points along the vertical axis 39.

What is claimed is:

1. Centering and chucking system for fixing the relative position between an interchangeable element having a reference axis and a carrier body having a reference axis, the reference axis of the carrier body defining the center of a coordinate system having coordinate axes, the centering and chucking system comprising:
   a plurality of guide elements associated with the carrier body,
   a plurality of chucking elements provided at the carrier body for retaining the interchangeable element,
   a plurality of abutment surfaces provided at the carrier body for supporting the interchangeable element the plurality of abutment surfaces mutually defining an abutment plane,
   a plurality of centering elements provided at the interchangeable element and coacting with the guide elements of the carrier body for positioning the interchangeable element in the abutment plane so that the reference axis of the interchangeable element is coincident with the reference axis of the carrier body, each of the centering elements having an oblique surface,
   each of the guide elements further comprising a guide surface,
   the guide surfaces being arranged along the coordinate axes of the coordinate system whose center is defined by the reference axis of the carrier body,
   each guide element, further having a pressure element adapted to be moved out of the carrier body at right angles to the abutment plane, the pressure element acting via the oblique surface of the centering element to urge the centering element towards the guide surface.

2. Centering and chucking system according to claim 1, wherein the coordinate system comprises a first axis and a second axis and further comprising a first centering element, a second centering element and a third centering element, wherein the first and second centering elements are arranged along the first axis of the coordinate system and the third centering element is arranged along the second axis of the coordinate system.

3. Centering and chucking system according to claim 1 wherein the chucking elements are flexibly biased and further comprising
   pressure-actuated operating means for releasing the interchangeable element from the carrier body.

4. Centering and chucking system according to claim 1, further comprising:
   spring means for hydraulically pressing the pressure elements out of the carrier body and
   operating means for withdrawing the pressure element into the carrier body.

5. Centering and chucking system according to claim 1 further comprising:
   movement means for moving out the pressure elements during a chucking operation, and
   withdrawal means for subsequently withdrawing the chucking elements during a chucking operation.

6. Centering and chucking system according to claim 2, further comprising:
   first centering means for centering the third centering element along the second axis, and
   second centering means for subsequently centering the first and second centering elements along the first axis.

7. Centering and chucking system according to claim 1 wherein the plurality of abutment surfaces comprise four abutment surfaces arranged at the four corners of a rectangle.

8. Centering and chucking system according to claim 2 wherein the guide surfaces provided along the first axis are spaced farther from the center of the coordinate system than the guide surface extending along the second axis.

* * * * *